United States Patent [19]

Gnyra

[11] 4,394,365
[45] Jul. 19, 1983

[54] METHOD FOR CURTAILING PHOSPHOROUS IMPURITY IN THE PRODUCTION OF HYDROGEN FLUORIDE

[75] Inventor: Bohdan Gnyra, Kingston, Canada

[73] Assignee: Alcan International Limited, Montreal, Canada

[21] Appl. No.: 331,772

[22] Filed: Dec. 17, 1981

[30] Foreign Application Priority Data

Jan. 5, 1981 [GB] United Kingdom ................. 8100110

[51] Int. Cl.³ ............................................... C01B 7/22
[52] U.S. Cl. .................................... 423/485; 423/484; 423/488
[58] Field of Search ................ 423/485, 488, 484, 301

[56] References Cited

U.S. PATENT DOCUMENTS 3,167,391  1/1965  Swinehart ........................... 423/485
3,870,786  3/1975  Kidde .................................. 423/484
4,078,047  3/1978  Spreckelmeyer .................... 423/485

Primary Examiner—Earl C. Thomas
Attorney, Agent, or Firm—Cooper, Dunham, Clark, Griffin & Moran

[57] ABSTRACT

In the generation of hydrogen fluoride gas for the production of $AlF_3$ by the reaction of fluorspar with concentrated sulphuric acid a small amount of aluminium sulphate is introduced into the reactive mix to assist in the retention of phosphorous compounds in the solid residues of the reaction and thus reduce the phosphorous content of the gaseous HF. Aluminium sulphate may be added as alum or may be generated in situ in the sulphuric acid by addition of an alumina hydrate, preferably before the acid is brought into contact with fluorspar. The addition of a small amount of calcium carbonate to the fluorspar also improves retention of phosphorous compounds in the solid residues in some instances.

8 Claims, No Drawings

METHOD FOR CURTAILING PHOSPHOROUS IMPURITY IN THE PRODUCTION OF HYDROGEN FLUORIDE

The present invention relates to an improved procedure for the generation of hydrogen fluoride from fluorspar mineral by reaction with sulphuric acid.

The production of hydrogen fluoride by the above indicated process is carried out on a large scale in connection with the manufacture of AlF$_3$ and/or artificial cryolite for use as flux in electrolytic reduction cells employed for the production of Al metal.

It is well known that the presence of phosphate compounds in the AlF$_3$ in amounts in excess of 200 ppm, expressed as P$_2$O$_5$, is undesirable and has adverse effects on the current efficiency of the electrolytic reduction cell.

The generation of hydrogen fluoride is conventionally performed by reacting finely ground fluorspar with very strong sulphuric acid (more than 95% concentration) at temperatures in the range of 195°-250° C., usually in the range of 195°-210° C. The sulphuric acid is employed in a slight excess (usually between 2% and 5%) of the stoichiometric amount of that required to react with the Ca and other metal values of the fluorspar and the process is carried out in an enclosed vessel, from which the generated gaseous hydrogen fluoride distills over into a reactor in which it is reacted with alumina.

Most available grades of fluorspar contain complex phosphates in such amounts that the resulting AlF$_3$ would contain 300-400 ppm of P$_2$O$_5$, unless special steps are taken to reduce the level of P$_2$O$_5$ in the generated hydrogen fluoride.

It is already known to pretreat the fluorspar with relatively dilute sulphuric acid or other mineral acid at a temperature below the hydrogen fluoride-generating temperature to leach out a part of the phosphate content, but that is a relatively expensive and time-consuming pretreatment operation. It is also known to treat the generated gaseous hydrogen fluoride to remove phosphorous values therefrom.

In the generation of hydrogen fluoride by reaction of fluorspar with sulphuric acid the phosphate content of the mineral is believed to be converted to phosphoric acid which is a stable compound and boils at about 260° C. It is believed that a proportion of the phosphoric acid is converted to calcium phosphate and is deposited in the anhydrous calcium sulphate (anhydrite) which is formed in the course of the reaction. Another portion of the generated phosphoric acid reacts with hydrogen fluoride to form a highly volatile compound, POF$_3$ which is carried over and reacts with the alumina in the alumina/hydrogen fluoride reactor.

The object of the invention is to carry out the calcium fluoride/sulphuric acid reaction in such a way that a much larger proportion of the phosphorous content of the mineral remains in the anhydrite residue in the reactor.

According to the present invention there is provided a process for the production of hydrogen fluoride by reaction of sulphuric acid of a concentration in excess of 95% by weight at a temperature of 195°-240° C. with fluorspar, containing phosphorous impurities, characterised in that for the purpose of reducing the phosphorous impurities in the generated gaseous hydrogen fluoride, the reaction of sulphuric acid with fluorspar is carried out in the presence of aluminum sulphate in an amount of about 0.4-2.5%, expressed as % Al on the basis of the fluorspar.

The aluminum sulphate is preferably present in an amount of about 0.75-2.0%, expressed as % Al on the basis of the fluorspar.

All the materials employed in the process should be essentially free of silica (including silicates), because contamination of the gaseous hydrogen fluoride by SiF$_4$ is undesirable. As is well known the fluorspar employed in the process should be selected on the basis of a low silica content.

A preferred material for use as a source of aluminium sulphate is the partially hydrated, very finely divided alumina, (E.S.P. dust), collected in electrostatic precipitators employed in conjunction with dehydration of alumina trihydrate. This E.S.P. dust is a cheap and convenient source of material for the present purpose. Where E.S.P. dust or other form of alumina hydrate is used it is preferably converted to aluminium sulphate by reaction with sulphuric acid before the fluorspar is added to the reaction vessel.

It has been found convenient to charge an appropriate amount of E.S.P. dust to the sulphuric acid at 80° C. and hold it at that temperature for about ten minutes to allow reaction of its reactive alumina content to take place (E.S.P. dust contains up to 25% unreactive alpha-alumina). After this holding period the fluorspar may be charged to the sulphuric acid and the mixture may then be raised to the normal process temperature (upwards of 195° C.). Where the process is carried out on a continuous basis the E.S.P. dust is pre-reacted with the sulphuric acid feed before introduction into the reactor.

Some further improvement in the operation of the process is achieved in some instances by the addition of up to 5% calcite with the fluorspar (calculated as % CaCO$_3$ on the basis of the fluorspar).

Conveniently an amount of 2-4% calcite is added and advantageous additional retention of P$_2$O$_5$ is noted in some cases where such addition is made.

It is a surprising feature of the invention that the presence of a small amount of aluminium sulphate in the reaction mixture leads to the deposition of an increased proportion of the phosphate content of the fluorspar as a stable deposit, which is essentially resistant to attack by the very aggressive H$_2$SO$_4$/HF medium at the temperature of 195°-230° C. or even somewhat higher, e.g. up to 240° C.

The use of aluminium sulphate as an additive to the reaction of sulphuric acid and fluorspar has important economic consequences, since it permits hydrogen fluoride to be generated from relatively cheap grades of fluorspar mineral for the production of cell-grade AlF$_3$ without employing relatively expensive acid pretreatment of the fluorspar mineral or of the generated hydrogen fluoride to remove volatile phosphorous values.

The invention has been tested on two different types of fluorspar, both having a P$_2$O$_5$ content in the region of 600-700 ppm, but having quite different levels of other impurities.

Their respective particle size distribution and the levels of various impurities are shown in TABLE 1 below.

TABLE 1

| Type | Chemical Analysis (%) CaF$_2$ | CaCO$_3$ | P$_2$O$_5$ | Particle Size. Distribution (% - mesh) 100/150 | 150/200 | 200/325 | −325 |
|---|---|---|---|---|---|---|---|
| Spar No. 1 | 92.7 | 5.0 | 0.069 | 1 | 7 | 35 | 57 |
| Spar No. 2 | 98.2 | 0.9 | 0.064 | 6 | 16 | 30 | 48 |

The experimental procedure was as follows. In all cases 25 g samples of fluorspar were pre-mixed in 250 ml Stainless steel beakers with measured amounts of 95.5% H$_2$SO$_4$ at 100°–150° C. to which were added small amounts of alum, Al$_2$(SO$_4$)$_3$, of between 0.0 and 3.5 g.

After agitation to remove excess gas and to decrease volume, the samples were placed in an oil bath at about 150° C., heated to 230°–240° C. and then kept at this temperature for between 30 min. and 70 min.

The obtained results are shown in TABLE 2 through 5.

TABLES 2 and 3 refer to the experiments with Spar No. 1 originally containing 690 ppm P$_2$O$_5$ impurity. In the experimental runs the amount of sulphuric acid and the time and the temperature of the reaction was varied. It will be seen that in all cases the retention of P$_2$O$_5$ in the anhydrite residue was increased from 50–60 ppm without alum addition to 80–90 ppm by appropriate addition of aluminium sulphate.

The same general remarks and conclusions apply to the results obtained with Spar No. 2 shown in TABLES 4 and 5.

The exact nature of the compounds responsible for the retention of P$_2$O$_5$ impurity in the anhydrite residue is not known. It may be in the form of one or several aluminium phosphates that seem to be relatively stable under the specified operating conditions.

TABLE 2

Fluorspar Spar No. 1
Acid 95.5% H$_2$SO$_4$

| Sample | Alum added expressed as % Al (spar basis) | Weight of Anhydrite (parts) | P$_2$O$_5$ in Anhydrite (ppm) | % P$_2$O$_5$ (of spar) left in Anhydrite |
|---|---|---|---|---|
| Run 1: 25 parts of spar + 29.5 parts of H$_2$SO$_4$, heated for 30 min. at 230° C. | | | | |
| 1 | 0.0 | 39.9 | 250 | 58 |
| 2 | 0.4 | 40.0 | 310 | 72 |
| 3 | 0.8 | 41.2 | 350 | 84 |
| 4 | 1.1 | 42.8 | 370 | 92 |
| Run 2: 25 parts of spar + 33 parts of H$_2$SO$_4$, heated for 60 min. at 235° C. | | | | |
| 1 | 0.0 | 42.0 | 220 | 53 |
| 2 | 0.4 | 43.2 | 330 | 81 |
| 3 | 0.8 | 43.6 | 360 | 90 |
| 4 | 1.1 | 44.0 | 350 | 88 |

The greater amount of anhydrite residue for each sample in Run 2 was compared with the corresponding sample in Run 1 is a result of different amounts of acid charged in both runs. The release of fluorine in Run 1 with undercharged acid would be less complete than in Run 2 with an excess of acid.

TABLE 3

Fluorspar Spar No. 1
Acid 95.5% H$_2$SO$_4$

| Sample | Alum added expressed as % Al (spar basis) | Weight of Anhydrite (parts) | P$_2$O$_5$ in Anhydrite (ppm) | % P$_2$O$_5$ (of spar) left in Anhydrite | % Residuals in Anhydrite F | H$_2$SO$_4$ |
|---|---|---|---|---|---|---|
| Run 3: 25 parts of spar + 35 parts of H$_2$SO$_4$, heated for 70 min. at 240° C. | | | | | | |
| 1 | 0.0 | 43.1 | 240 | 59 | 0.4 | 1.5 |
| 2 | 0.4 | 43.7 | 280 | 71 | 0.8 | 3.5 |
| 3 | 0.8 | 44.8 | 280 | 73 | 0.7 | 4.7 |
| 4 | 1.1 | 46.0 | 300 | 80 | 2.1 | 4.9 |
| Run 4: 25 parts of spar + 35 parts of H$_2$SO$_4$, heated for 30 min. from 150° C. to 230° C. 30 min. at 230° C. | | | | | | |
| 1 | 0.0 | 44.0 | 260 | 66 | 0.4 | 3.6 |
| 2 | 0.4 | 44.1 | 310 | 79 | 0.6 | 5.0 |
| 3 | 0.8 | 46.3 | 320 | 86 | 1.8 | 7.6 |
| 4 | 1.1 | 46.9 | 320 | 87 | 0.4 | 9.2 |

TABLE 4

Fluorspar Spar No. 2
Acid 95.5% H$_2$SO$_4$

| Sample | Alum added expressed as % Al (spar basis) | Weight of Anhydrite (parts) | P$_2$O$_5$ in Anhydrite (ppm) | % P$_2$O$_5$ (of spar) left in Anhydrite |
|---|---|---|---|---|
| Run 1: 25 parts of spar + 29.5 parts of H$_2$SO$_4$, heated for 30 min. at 230° C. | | | | |
| 1 | 0.0 | 40.2 | 270 | 67 |
| 2 | 0.4 | 40.9 | 306 | 78 |
| 3 | 0.8 | 42.8 | 333 | 89 |
| 4 | 1.1 | 44.8 | 351 | 98 |
| Run 2: 25 parts of spar + 33 parts of H$_2$SO$_4$, heated for 60 min. at 230° C. | | | | |
| 1 | 0.0 | 42.0 | 240 | 52 |
| 2 | 0.4 | 42.9 | 270 | 71 |
| 3 | 0.8 | 44.1 | 280 | 76 |
| 4 | 1.1 | 44.6 | 290 | 80 |

It will be noted that, as in TABLE 2, the retention of P$_2$O$_5$ in the anhydrite residue is somewhat decreased with increase in the excess of sulphuric acid and in the time of reaction from 30 minutes to 60 minutes.

TABLE 5

Fluorspar Spar No. 2
Acid 95.5% H$_2$SO$_4$

| Sample | Alum added expressed as % Al (spar basis) | Weight of Anhydrite (parts) | P$_2$O$_5$ in Anhydrite (ppm) | % P$_2$O$_5$ (of spar) left in Anhydrite | % Residuals in Anhydrite F | H$_2$SO$_4$ |
|---|---|---|---|---|---|---|
| Run 3: 25 parts of spar + 35 parts of H$_2$SO$_4$, heated for 70 min. at 240° C. | | | | | | |
| 1 | 0.0 | 44.1 | 190 | 52 | 1.3 | 6.0 |
| 2 | 0.4 | 44.6 | 230 | 63 | 1.3 | 2.5 |
| 3 | 0.8 | 44.9 | 250 | 69 | 1.7 | 3.6 |
| 4 | 1.0 | 46.3 | 270 | 77 | 1.7 | 4.6 |
| Run 4: 25 parts of spar + 35 parts of H$_2$SO$_4$, heated for 30 min. from 150° C. to 230° C. 30 min. at 230° C. | | | | | | |
| 1 | 0.0 | 43.3 | 180 | 49 | 1.6 | 1.8 |
| 2 | 0.4 | 44.4 | 250 | 69 | 2.3 | 3.4 |
| 3 | 0.8 | 45.9 | 250 | 72 | 4.0 | 6.4 |
| 4 | 1.1 | 47.1 | 270 | 80 | 5.1 | 9.6 |

It will be noted that decrease in reaction temperature from 240° C. to 230° C. led to some improvement in phosphate retention accompanied by some decrease in efficiency of utilisation of available fluoride.

Experimental runs shown in TABLES 6 and 7 were designed to compare the effectiveness of $Al_2O_3.3H_2O$ addition to $H_2SO_4$ as against the addition of ground alum, $Al_2(SO_4)_3.18H_2O$, as well as to indicate the effect of a prolonged heating of the reactants of 3-4 hrs. at around 205° C., Run 3, TABLE 6, and 200°-250° C., Run 3, TABLE 7.

It will be seen that the comparative runs with alumina trihydrate additions gave slightly inferior results of $P_2O_5$ retention, by 6-7 percentage points, than those with the equivalent amounts of alum additions. One of the reasons for this discrepancy may be that the added alumina hydrate did not completely react with sulphuric acid to form alum before the fluorspar was mixed in. A prolonged heating of the test samples at the indicated temperature (Run 3, TABLES 6 and 7) had little effect on the extent of $P_2O_5$ retention in the resulting anhydrite.

TABLE 8 gives the results on duplicate samples of both Spar No. 1 and Spar No. 2. Both runs were conducted under identical operating conditions of long heating time of 6 hours at about 200° C. in partially covered reaction vessels and when treating the reaction slurries with the maximum recommended amounts of ground alum added to preheated sulphuric acid. It will be noted that a very good reproducibility of the duplicate results was achieved (within two percentage points) and the retention of the original $P_2O_5$ impurity in the resulting waste anhydrite was between 80-90%. Spar No. 1 gave about 6 percentage points higher $P_2O_5$ retention than Spar No. 2.

TABLE 6

Fluorspar Spar No. 1 (Runs 1 and 3) Spar No. 2 (Run 2)
Acid 95.5% $H_2SO_4$

| Sample | Alum added expressed as % Al (spar basis) | Weight of Anhydrite (parts) | $P_2O_5$ in Anhydrite (ppm) | % $P_2O_5$ (of spar) left in Anhydrite | % Residuals in Anhydrite F | $H_2SO_4$ |
|---|---|---|---|---|---|---|
| \multicolumn{7}{c}{Run 1: 25 parts of spar + 35 parts of $H_2SO_4$, heated for 30 min. from 100° C. to 230° C. 30 min. at 230° C.} |
| 1 | 0.0 | 44.0 | 260 | 66 | 0.4 | 3.6 |
| 2 | 0.4 | 44.1 | 310 | 79 | 0.6 | 5.0 |
| 3 | 0.8 | 46.3 | 320 | 86 | 1.8 | 7.6 |
| 4 | 1.1 | 46.9 | 320 | 87 | 0.4 | 9.2 |
| \multicolumn{7}{c}{Run 2: 25 parts of spar + 35 parts of $H_2SO_4$, heated for 30 min. from 100° C. to 230° C. 30 min. at 230° C.} |
| 1 | 0.0 | 43.3 | 180 | 49 | 1.6 | 1.8 |
| 2 | 0.4 | 44.4 | 250 | 69 | 2.3 | 3.4 |
| 3 | 0.8 | 45.9 | 250 | 72 | 4.0 | 6.4 |
| 4 | 1.1 | 47.1 | 270 | 80 | 5.1 | 9.6 |
| \multicolumn{7}{c}{Run 3: 25 parts of spar + 35 parts of $H_2SO_4$, heated between 200° C.-210° C. for 24 hours} |
| 1 | 0.0 | 43.4 | 270 | 68 | — | — |
| 2 | 0.4 | 44.5 | 290 | 75 | — | — |
| 3 | 0.8 | 45.2 | 320 | 84 | — | — |
| 4 | 1.1 | 46.1 | 310 | 83 | — | — |

TABLE 7

Fluorspar Spar No. 1 (Run 1) Spar No. 2 (Runs 2 and 3)
Acid 95.5% $H_2SO_4$

| Sample | Alumina trihydrate added expressed as % Al (spar basis) | Weight of Anhydrite (parts) | $P_2O_5$ in Anhydrite (ppm) | % $P_2O_5$ (of spar) left in Anhydrite | % Residuals in Anhydrite F | $H_2SO_4$ |
|---|---|---|---|---|---|---|
| \multicolumn{7}{c}{Run 1: 25 parts of spar + 36 parts of $H_2SO_4$, heated for 30 min. from 100° C. to 230° C. 30 min. at 230° C.} |
| 1 | 0.0 | 43.6 | 260 | 66 | 1.7 | 2.0 |
| 2 | 0.4 | 43.9 | 290 | 74 | 1.7 | 4.2 |
| 3 | 0.8 | 45.3 | 300 | 79 | 1.9 | 6.4 |
| 4 | 1.1 | 46.8 | 290 | 79 | 1.9 | 7.9 |
| \multicolumn{7}{c}{Run 2: 25 parts of spar + 36 parts of $H_2SO_4$ heated for 30 min. from 100° C. to 230° C. 30 min. at 230° C.} |
| 1 | 0.0 | 43.4 | 180 | 49 | 1.9 | 0.8 |
| 2 | 0.4 | 43.5 | 240 | 65 | 2.5 | 2.3 |
| 3 | 0.8 | 44.9 | 250 | 70 | 3.5 | 4.8 |
| 4 | 1.1 | 46.4 | 250 | 73 | 3.6 | 6.2 |
| \multicolumn{7}{c}{Run 3: 25 parts of spar + 36 parts of $H_2SO_4$ heated for 2 hours at 200° C. 1 hour at 250° C.} |
| 1 | 0.0 | 43.6 | 240 | 65 | 0.8 | 1.8 |
| 2 | 0.4 | 44.8 | 240 | 67 | 0.8 | 3.7 |
| 3 | 0.8 | 43.3 | 250 | 68 | 1.0 | 5.6 |
| 4 | 1.1 | 45.0 | 260 | 73 | 1.2 | 7.5 |

TABLE 8

Fluorspar Spar No. 1 (Run 1) Spar No. 2 (Run 2)
Acid 95.5% $H_2SO_4$

| Sample | Alum added expressed as % Al (spar basis) | Weight of Anhydrite (parts) | $P_2O_5$ in Anhydrite (ppm) | % $P_2O_5$ (of spar) left in Anhydrite |
|---|---|---|---|---|
| \multicolumn{5}{c}{Run 1: 25 parts of spar + 36 parts of $H_2SO_4$ heated for 6 hours at 200° C. (partially covered)} |
| 1 | 1.0 | 45.2 | 340 | 89 |
| 2 | 1.0 | 45.6 | 330 | 87 |
| \multicolumn{5}{c}{Run 2: 25 parts of spar + 36 parts of $H_2SO_4$ heated for 6 hours at 200° C. (partially covered)} |
| 1 | 1.0 | 45.6 | 290 | 83 |
| 2 | 1.0 | 46.1 | 280 | 81 |

In another series of tests a fluorspar having a high $P_2O_5$ content (2900 ppm) was treated and aluminium sulphate was added as alum or generated in situ by addition of E.S.P. dust or alumina trihydrate. Calcium carbonate (calcite) was also added. The results are as shown in TABLE 9.

TABLE 9

Spar Analysis: (%): 96.8 $CaF_2$, 0.5 $CaCO_3$, 1.1 $SiO_2$
0.290 $P_2O_5$

Concentrated sulphuric acid with or without additives was pre-mixed with between 0.68 and 0.72 weight parts of the spar in question and then heated at 200° C. for 4 hours. The resulting anhydrite was analysed for the residual $P_2O_5$ content.

| Samples | Additives (% of Spar) As Al | $CaO_3$ | % $P_2O_5$ Retained in Anhydrite Residue of that in Spar |
|---|---|---|---|
| 1 | 0 | 0 | 50 |
| 2 | 1 (Alum) | 0 | 87 |
| 3 | 2 (ESP dust)(*) | 0 | 79 |
| 4 | 2 (ESP dust)(*) | 4 | 90 |
| 5 | 2 Hydrate(**) | 4 | 87 |

(*)Aluminous dust from electrostatic precipitator in a Bayer process alumina production plant. About 15% total water content and about 25% unreactive alumina.
(**)Fine $Al_2O_3.3H_2O$.

It will be seen that the proportion of $P_2O_5$ retained in the anhydrite residue is comparable with that retained in the case of the fluorspars employed in the tests recorded in TABLES 2-8, in spite of the much higher initial $P_2O_5$ content of the fluorspar employed in this series of tests.

Similar results have also been obtained with naturally occurring fluorspars of widely different origin and having a phosphorous content in the range of 500-3000 ppm (as $P_2O_5$).

I claim:

1. A process for the production of hydrogen fluoride by reaction of sulphuric acid of a concentration in excess of 95% by weight at a temperature of 195°-240° C. with fluorspar, containing phosphorous impurities, characterised in that for the purpose of reducing the phosphorous impurities in the generated gaseous hydrogen fluoride, the reaction of sulphuric acid with fluorspar is carried out in the presence of aluminium sulphate in an amount of about 0.4-2.5%, expressed as % Al on the basis of the fluorspar.

2. A process according to claim 1 further characterised in that the amount of aluminium sulphate, expressed as % Al, present in the reaction mixture is in the range of about 0.75-2.0%.

3. A process according to claim 1 or 2 further characterised in that an essentially silica-free calcite is also added in an amount up to 5%, expressed as % $CaCO_3$ on the basis of the fluorspar.

4. A process according to claim 1 or 2, further characterised in that the aluminium sulphate is generated in situ by the addition of a material containing reactive alumina.

5. A process according to claim 4 further characterised in that the reactive alumina-containing material is pre-reacted with the sulphuric acid before commencement of the reaction of the sulphuric acid with fluorspar.

6. A process according to claim 1 further characterised in that the reaction of fluorspar with sulphuric acid is carried out at a temperature in the range of 200°-220° C.

7. A process according to claim 3, further characterised in that the aluminium sulphate is generated in situ by the addition of a material containing reactive alumina.

8. A process according to claim 7, further characterised in that the reactive alumina-containing material is pre-reacted with the sulphuric acid before commencement of the reaction of the sulphuric acid with fluorspar.

* * * * *